May 12, 1953

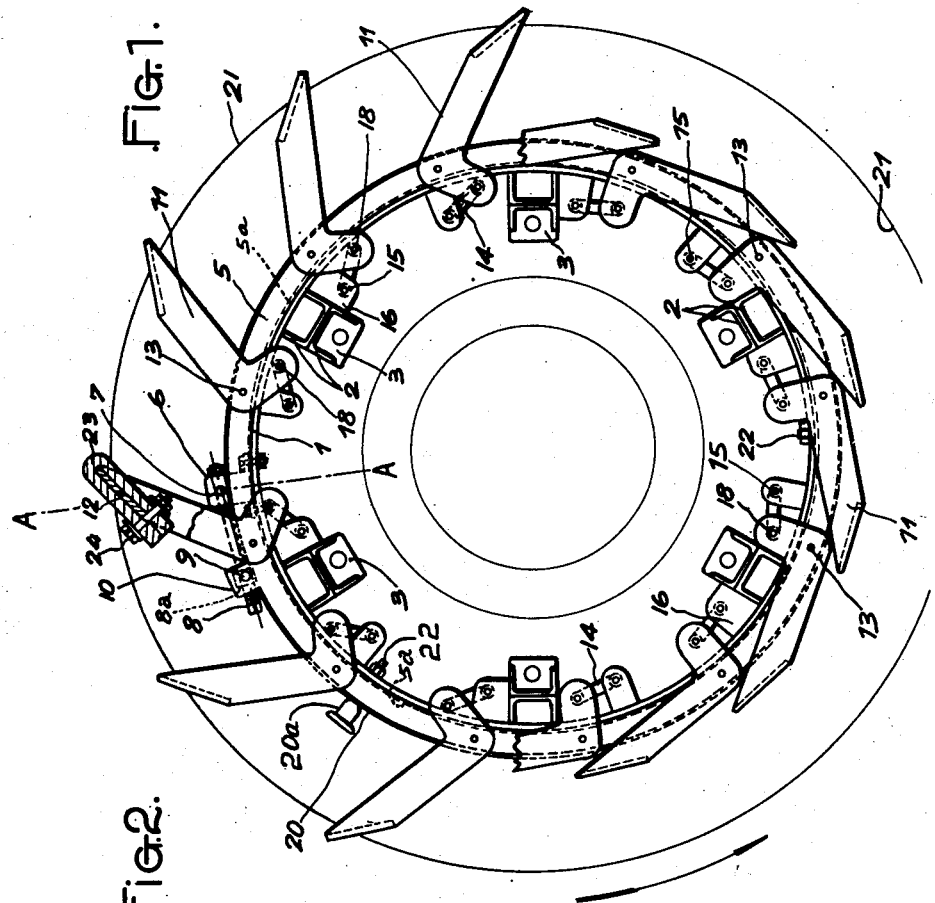

L. COLIN 2,638,384

RETRACTABLE STRAKE DEVICE

Filed May 18, 1950

INVENTOR
LOUIS COLIN
BY *[signature]*
ATTY.

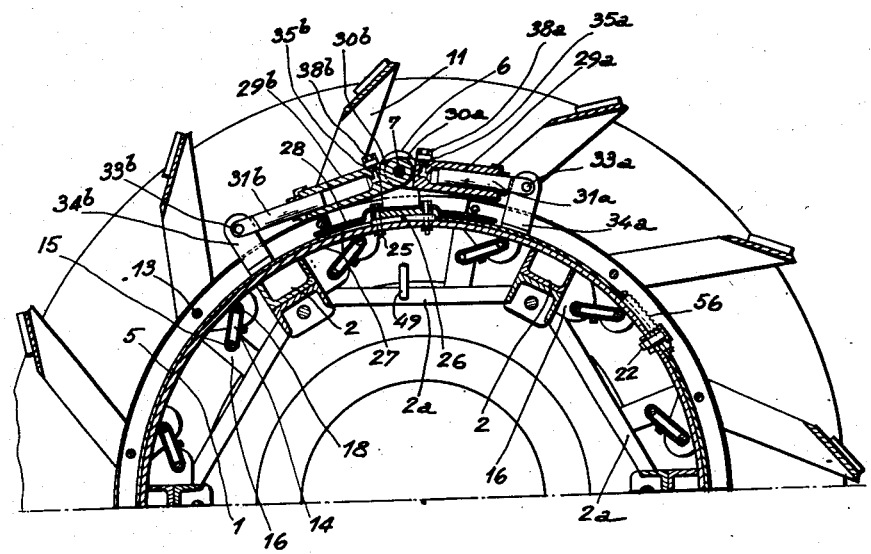
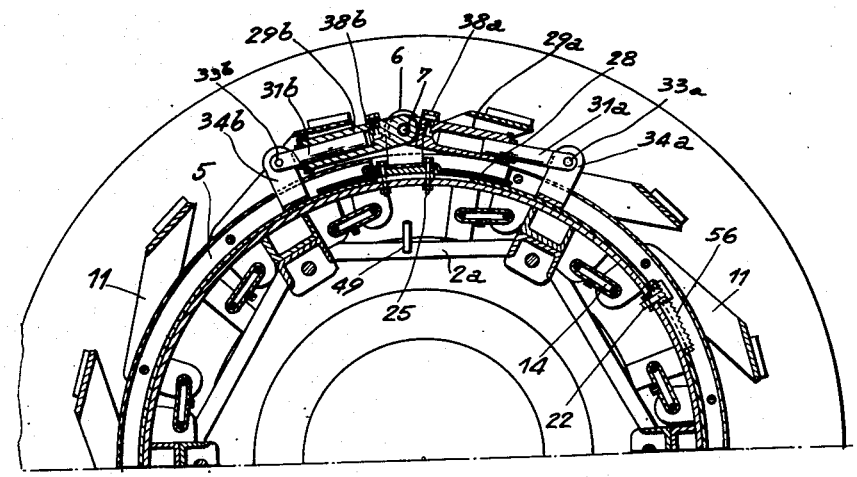

May 12, 1953　　　　　L. COLIN　　　　　2,638,384
RETRACTABLE STRAKE DEVICE
Filed May 18, 1950　　　　　　　　　　　6 Sheets-Sheet 4

INVENTOR
LOUIS COLIN
BY *[signature]*
ATTY.

May 12, 1953 — L. COLIN — 2,638,384
RETRACTABLE STRAKE DEVICE
Filed May 18, 1950 — 6 Sheets-Sheet 5

INVENTOR
LOUIS COLIN
BY [signature]
ATTY.

May 12, 1953  L. COLIN  2,638,384
RETRACTABLE STRAKE DEVICE
Filed May 18, 1950  6 Sheets—Sheet 6

INVENTOR
LOUIS COLIN
BY [signature]
ATTY

Patented May 12, 1953

2,638,384

UNITED STATES PATENT OFFICE 2,638,384

RETRACTABLE STRAKE DEVICE

Louis Colin, Quimper, France

Application May 18, 1950, Serial No. 162,620
In France May 23, 1949

10 Claims. (Cl. 301—47)

This invention relates to a retractable strake device which is adapted to be mounted on the wheels of tractors or other vehicles having pneumatic or solid rubber tyres.

The device according to the invention has the advantage that it can be secured immediately to the driving wheels of a tractor, for example, without necessitating a modification of the said wheels. It has the further advantage that its retractable strakes enable the vehicle to operate on the roads or on hard ground by rolling on the tyres, and to operate on loose or muddy ground with the use of the strakes, the adhesion of which is substituted or added to that of the tyres.

The main feature of the device according to the invention resides in the fact that it comprises a first ring, brackets fastened to said first ring and adapted to be fastened and laterally centered on the wheel, a second ring mounted on said first ring so as to be angularly movable with respect thereto, strakes hingedly mounted on said second ring, and links connecting said strakes to fixed points on said first ring, so that said strakes are retracted, or extended beyond the thread of the tyre on said wheel, according to the angular position of said second ring with respect to said first ring.

The second ring carrying the strakes is advantageously formed by a channel-iron the cavity of which is used as a grease container, said cavity being closed by a metal sheet and holes being provided in the web of said channel-iron, so as to give the grease access to the surfaces by which said web and the underlying fixed first ring slide on each other.

The heads of the links connecting the strakes to the fixed ring are tubular and are connected together by a hollow link body containing a reserve of grease.

The invention also relates to the means for adjusting the angular position of the movable second ring with respect to the fixed ring, in order to extend or to retract the strakes, which means may comprise a screw and nut mechanism or a pair of hydraulic jacks.

Other features of the invention will appear in the following description and in the accompanying drawings, in which:

Figs. 1 and 2 relate to a first embodiment, of which

Fig. 1 is an elevational view of the device mounted on a wheel, some of the strakes being shown in extended position and the others in retracted position, and Fig. 2 is a somewhat diagrammatic vertical diametral section.

Figs. 3 to 11 relate to a second embodiment, of which

Figure 5:
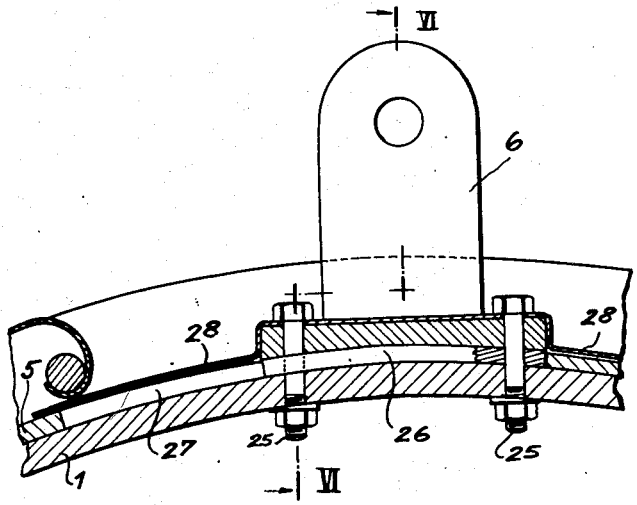
Figure 6:
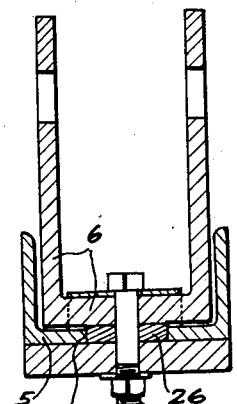
Figure 9:
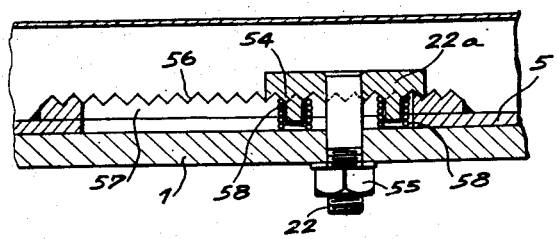
Figure 10:
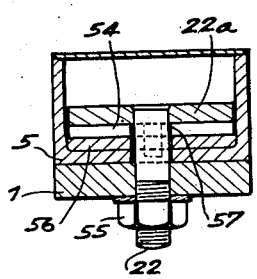
Figure 8:
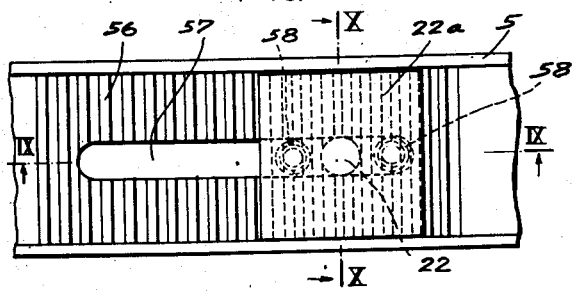
Figure 7:
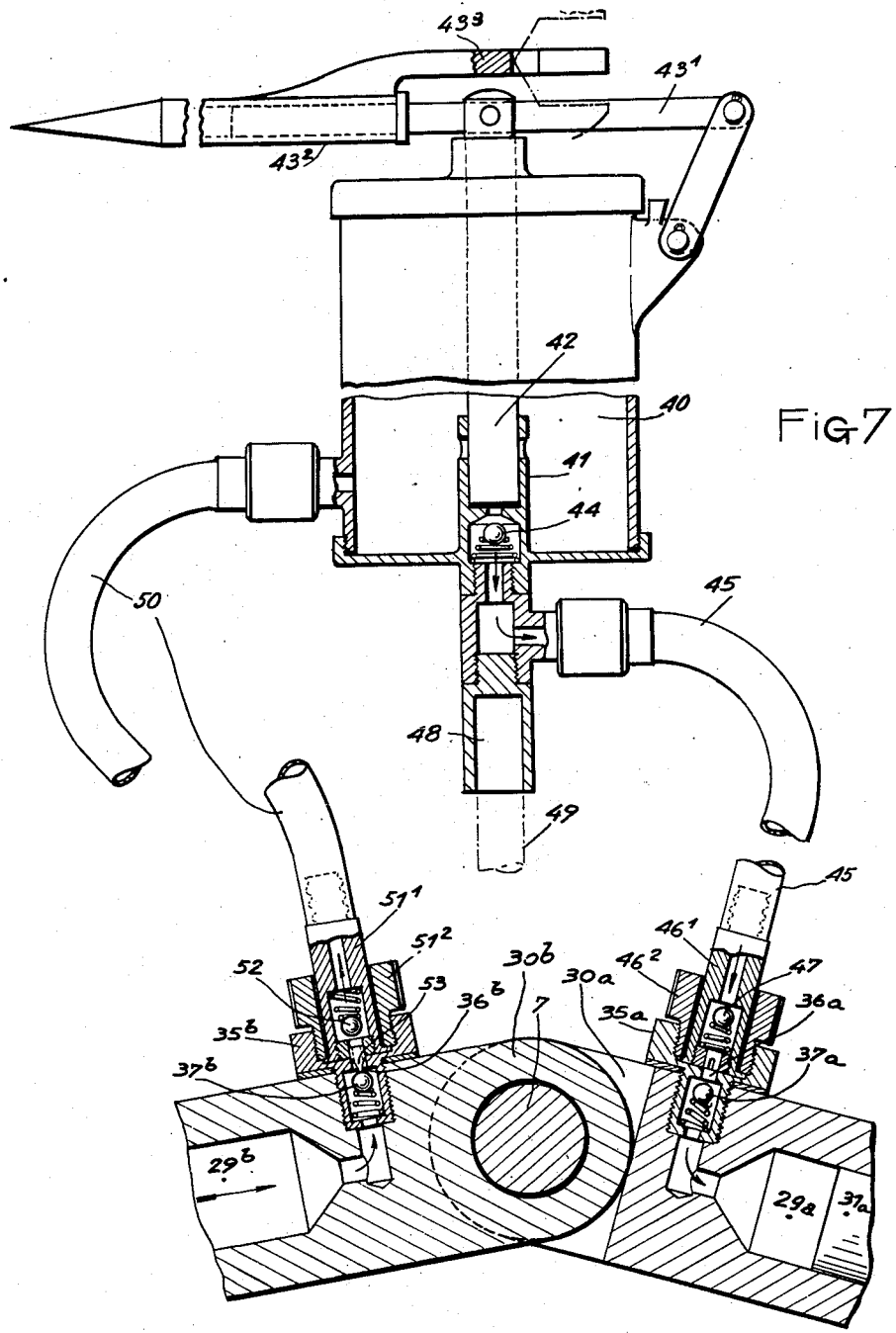
Figure 11:
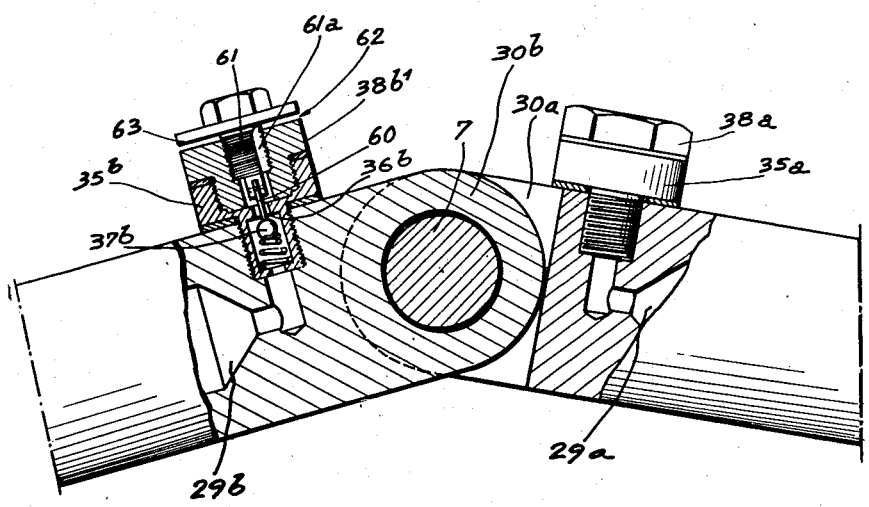

Fig. 3 is an elevational view of one half of the device, showing the strakes in their extended or active position, Fig. 4 is an elevational view of one half of the device, showing the strakes in their retracted or "road" position, Fig. 5 is a section, at a larger scale, of a portion of the two rings, showing the manner in which the fork supporting the common hinge axis of the jacks is mounted on the fixed ring, Fig. 6 is a section on line VI—VI of Fig. 5, Fig. 7 is an elevation, with parts in section, showing the jacks and the oil compressor for actuating the same, Fig. 8 is a plan view, at a larger scale than Figs. 5 and 6, of a device for locking the movable ring on the fixed ring, Fig. 9 is a longitudinal section on line IX—IX of Fig. 8, Fig. 10 is a cross section on line X—X of Fig. 8 and Fig. 11 illustrates the operation of the jacks when the strakes are brought to their "road" position without the use of a compressor.

Figure 2A:
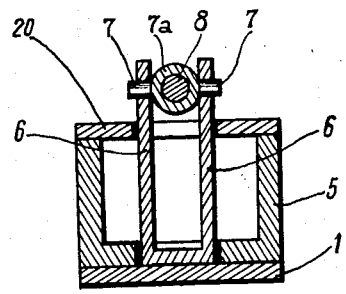
Fig. 2a is a detail cross section on line A—A of Fig. 1.

In the first embodiment, shown in Figs. 1 and 2, the inner ring is for example made of a flat iron band 1 which is bent, has its ends welded together and is provided with brackets 2 which are formed, for example, by two channel-irons welded together and to the ring 1. These brackets, which are evenly distributed over the circumference of the ring 1, have end plates 3 which are formed with holes through which they can be fastened to the wheel by means of bolts, such as, for example, the same bolts or stud-bolts by which the wheel rim 4 is mounted on the wheel disc. The ring 1 may also be a metal casting integrally formed with the brackets 2.

The movable ring 5, which carries the retractable strakes, is formed by a channel-iron which is adjusted by the back of its web on the outer surface of the fixed ring 1. The movable ring 5 is displaced angularly on the fixed ring by means of a mechanism which comprises in this embodiment a screw and a nut. A fork 6 which is rigidly mounted, for example welded, on the fixed ring 1 passes through a circumferential slot formed in the web of the movable ring 5 and carries a bearing 7a (Fig. 2a) pivoted on a pin 7 and in which the end of a screw 8 is able to rotate but locked against longitudinal displacement. The screw 8 engages a nut 8a which is pivoted on a pin 9 between two wings or extensions 10 provided on the flanges of the movable ring 5. By turning the square end of the screw 8, by means of a wrench (which may be the same as that used for mounting the wheel-rim 4 on the wheel-disc) the movable ring 5 can be displaced angularly on the fixed ring 1, in one or the other direction.

The non-slip strakes are advantageously formed by pairs of angle-shaped flat irons 11 which are connected together at their outer ends by a welded plate 12. The spacing between these angle-shaped irons 11 is equal to the width of the rings 1 and 5 over which they fit exactly, and they are pivotally mounted on pins 13 which traverse the wings of the movable ring 5 at regularly distributed points. The ends of the shorter inner arms of each pair of angle-shaped irons 11 forming a strake are connected together by a pin 18 on which is pivotally mounted one end of a link 14 the opposite end of which is pivotally mounted on a pin 15 carried by two wings 16 welded to the ring 1 or to the brackets 2. The strakes could of course also be made of cast metal.

The links 14 have the shape of a double T. Their body portion 14 is tubular and their heads 17, which are also tubular, are pivotally engaged on the pins 15 and 18. The inner cavity of each link body 14 forms a grease container. By mounting a lubricator or grease-box on each link body 14, a grease supply sufficient for a prolonged service can be provided.

The cavity of the channel-iron which forms the movable ring 5 can also be used as a grease container and to this effect the said cavity can be closed by a strip iron 20 on which are mounted one or more lubricators or grease-boxes 20a. The grease lubricates the bearing surfaces of the pins 13 and passes through conveniently distributed holes 5a to the surface by which the fixed ring 1 and the movable ring 5 slide on each other.

It will be easily understood that by turning the screw 8 in the convenient direction, the strakes 11—12 can be retracted inwardly, as shown in the lower half of Fig. 1, or extended outwardly, as shown in the upper half of Fig. 1.

In the first case, the vehicle wheel adheres to the ground only by the tread of its tyre 21, while in the second case the ends of the strakes 11—12 penetrate into the ground so as to increase the adhesion.

In order to avoid an overstraining of the threads of the screw 8 by the intense effort resulting from the reactions of the strakes 11—12 engaging the ground, a feature of the invention consists in the provision of means for locking the movable ring 5 on the fixed ring 1.

Figure 2B:
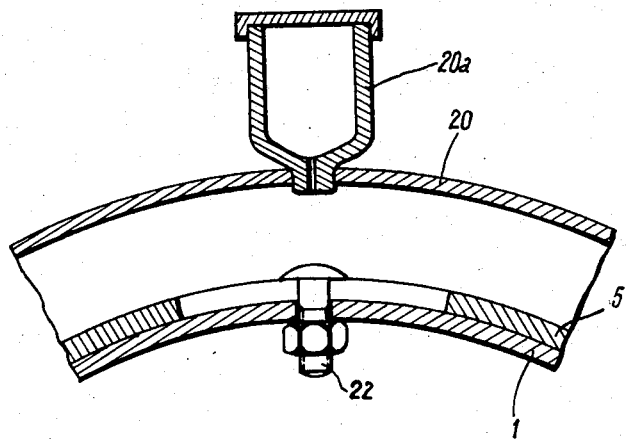
Fig. 2b is a detail section of the ring structure of Fig. 1, showing a lubricator and a locking bolt provided thereon.

In the present embodiment, these means are formed by one or more bolts 22 the stem of which passes through a hole in the fixed ring 1 and through a circumferentially elongated aperture formed in the web of the movable ring 5, as shown in Fig. 2b.

Each bolt 22 carries a nut which is accessible from the inner side of the fixed ring 1, whereby the movable ring 5 can be locked on the fixed ring 1 after extension of the strakes 11—12.

The shape of the outer active ends of the strakes 11—12 is such that they can be fitted with rubber shoes 23 which are maintained in position by a bolt 24 the stem of which is in contact with the inner edge of the plate 12, as shown at the upper parts of Figs. 1 and 2.

The fitting of the strakes with the shoes 23 is advantageous in that it avoids a damaging of the roots and root-crops, particularly during the harvesting of potatoes.

In Figs. 3 and 4, which relates to a second embodiment of the invention, the fixed ring 1 is again secured to the vehicle wheel by brackets 2, which are in this case cross-braced by struts 2a.

The movable ring 5 is again formed by a channel-iron; the angle-shaped strakes 11 are pivotally mounted on pins 13 and their inner arms are pivotally connected at 18 to links 14 the opposite ends of which are pivotally connected at 15 to pairs of wings 16 secured to the fixed ring 1 or to the brackets 2.

The fork 6 is mounted on the fixed ring 1 by means of bolts 25 traversing a key 26 (Figs. 5 and 6) which is engaged in a slot 27 provided in the web of the channel-iron forming the movable ring 5. The bolts 25 also hold a metal sheet 28 which extends to both sides of the fork 6 so as to cover and to protect the part of said slot which is left free, on one or the other side of the key, according to the position of the movable ring 5 with respect to the fixed ring 1.

The fork 6 carries the pin 7 on which are pivotally mounted the cylinders 29a and 29b of two oppositely directed hydraulic jacks. The cylinder 29a is mounted on the pin 7 by a work 30a and the cylinder 29b is mounted on the pin 7 by a flat head 30b engaged between the branches of the fork 30a. The diameter of the holes formed in said fork and head for the passage of the pin 7 is such that it leaves a certain play, due to which the head 30b can engage the bottom of the fork 30a and the jacks prop up against each other, so that the pin 7 is submitted to no bending or shearing stress.

Preferably, the two hydraulic jacks comprise each respectively a piston 31a or 31b which is pivotally connected at its outer end to a pin 33a or 33b carried by a fork 34a or 34b formed by wings fastened on the flanges of the channel-iron forming the movable ring 5.

Each of the cylinders 29a and 29b is provided respectively, for its filling and emptying, with a single connecting socket 35a or 35b the passage 36a or 36b of which is controlled by a spring-pressed one-way valve 37a or 37b. At rest, that is to say when the strakes 11 are either in the extended active or in the retracted road position, each of the sockets 35a and 35b is closed respectively by a stopper 38a or 38b.

In the active position (Fig. 3) the cylinder 29b is filled with oil and its piston 31b is in its outer position, while the piston 31a of the other cylinder is in its inner position.

In combination with the hydraulic jacks which have been described, use may be made of the oil compressor shown in Fig. 7.

This compressor comprises a tank 40, a pump cylinder 41, a pump piston 42 controlled by a lever 43$^1$—43$^2$, a delivery valve 44 and a delivery pipe 45 which carries at its end a connecting nipple in two parts 46$^1$, 46$^2$, part 46$^1$ of which is provided with a one-way valve 47, while part 46$^2$ is adapted to be screwed into either of the sockets 35a and 35b of the jacks.

The compressor is advantageously provided with a tubular support 48 which can be engaged on a rod 49 secured to the fixed ring 1, for example by being welded on one of the struts 2a, whereby the compressor can be operated without being held by hand.

The compressor is further provided with a pipe 50 connected to the tank 40 and carrying at its end a connecting nipple 51$^1$—51$^2$ the part 51$^1$ of which is provided with a one-way valve 52 and with a finger 53 adapted to open the one-way valve 37a or 37b of either of the jacks, when the part 51$^2$ is screwed into the socket 35a or 35b of the jack cylinder which is to be emptied.

Starting from the position shown in Fig. 3, when it is desired to bring the strakes 11 to the retracted inactive or road position shown in Fig. 4, the device is operated as follows:

The stoppers 38a and 38b are withdrawn and connections are made, as shown in Fig. 7, on the one hand between the connecting nipple 46¹—46² of the delivery pipe 45 of the compressor and the connecting socket 35a of the jack cylinder 29a, and on the other hand between the connecting nipple 51¹—51² of pipe 50 and the connecting socket 35b of the jack cylinder 29b. The lever of the compressor is then operated, whereby the cylinder 29a is filled by the oil under pressure which opens the valves 44, 47 and 37a. The piston 31a is thus progressively forced out of the cylinder 29a and turns the movable ring 5 clockwise, whereby the strakes 11 are brought to the desired retracted position. Simultaneously, the piston 31b enters the cylinder 29b and expels the oil contained in the latter. As the valve 37b is now opened by the finger 53, the oil passes through the passage 36b, opens the valve 52 and returns to the tank 40 of the compressor, through pipe 50.

When it is desired to obtain a displacement of the movable ring in the opposite direction, in order to extend the strakes 11 again, as shown in Fig. 3, it is sufficient to reverse the above described connections and to operate the compressor.

As in the embodiment of Figs. 1 and 2, bolts 22 are provided for locking the movable ring 5 on the fixed ring 1, particularly when the strakes 11 are in active position, whereby the reaction of the strakes during the advance of the vehicle is prevented from being transmitted through the movable ring 5 to the piston 31b. Thus, the oil contained in the cylinder 29b is not compressed during the operation of the vehicle and a leakage of this oil is avoided.

In order to ascertain a positive locking of the ring 5 on the ring 1 by the bolts 22, the head 22a of each of these bolts, which is located inside the channel-iron of the ring 5, as shown in Figs. 8 to 10, is provided on its lower surface with teeth 54 which engage, when the nut 55 is tightened on the bolt 22, the teeth of a rack 56 mounted on the bottom of the channel-iron 5. This rack is formed with an elongated opening 57 through which passes the stem of the bolt 22, springs 58 being provided for raising the head 22a of the bolt 22 when the nut 55 is subsequently unscrewed, so as to disengage the teeth 54 from the rack 56.

In order to reduce the number of tools required, the part 43² of the operating lever of the compressor can be made removable and carry a spanner 43³ for the nuts 55, while the pointed end of part 43² can be used for cleaning purposes.

Instead of using an ordinary stopper for closing the socket 35b of the jack cylinder 29b controlling the extension of the strakes into their active position, the socket 35b may be provided with a special stopper 38b¹ which is shown in Fig. 11. This stopper is provided with a finger 60 which opens the valve 37b when the screw 61 is screwed into the stopper. The screw 61 has a flattened portion 61a forming a passage which communicates with a clearance 62 left between the washer 63 and the top of the stopper body, even when the screw 61 is screwed in and the finger 60 is in the position in which it opens the valve 37b.

With the aid of this special stopper, the strakes can be brought back to their road position without using the compressor. To this effect, the stoppers are left in position and the valve 37b is opened by screwing in the screw 61, whereafter the vehicle is made to advance. The reaction of the ground on the strakes pushes them towards their retracted position and forces the piston 31b into its cylinder 29b, the oil contained in the latter escaping freely through the passage 36b, the passage 61a and the clearance 62 of the special stopper.

When the vehicle has advanced sufficiently to retract the strakes completely, the screw 61 is unscrewed again and the nuts 55 are tightened on the bolts 22, so as to lock the movable ring 5 on the fixed ring 1.

It will be understood that the invention is not limited to the embodiments which have been described and illustrated by way of example only and that it can give rise to other embodiments lying within the scope of the appended claims.

I claim:

1. A retractable strake device for the wheels of tractors and other vehicles, comprising a first ring, brackets fastened to said first ring and adapted to be secured and laterally centered on the vehicle wheel, a second ring slidably mounted on said first ring so as to be angularly movable with respect thereto, said second ring being of channel section and having a web engaging the outer surface of said first ring and two outwardly directed flanges, a wall closing the channel section of said second ring to form a grease container therein, said web being formed with holes for the passage of grease to the surfaces by which said second ring slides on said first ring, strakes pivotally mounted on said second ring and links connecting said strakes to fixed points of said first ring.

2. A retractable strake device for the wheels of tractors and other vehicles, comprising a first ring, brackets fastened to said first ring and adapted to be secured and laterally centered on the vehicle wheel, a second ring mounted on said first ring so as to be angularly movable with respect thereto, strakes hingedly mounted on said second ring, links connecting said strakes to fixed points of said first ring in such manner that said strakes are retracted when said second ring is in a first angular position with respect to said first ring and are extended beyond the tread of the tyre on said vehicle wheel when said second ring is in a second angular position with respect to said first ring, said first ring being formed with at least one hole, said second ring being formed with a circumferentially elongated aperture overlying each of said holes, and a locking bolt passing through each of said holes and the corresponding circumferentially elongated aperture, the circumferential length of said aperture corresponding to the angular distance between said first and second angular position of said second ring with respect to said first ring.

3. A retractable strake device as claimed in claim 2, comprising a rack mounted on said second ring adjacent said elongated aperture, a head formed on the outer end of said locking bolt, teeth on the lower surface of said head, a nut screwed on the inner end of said locking bolt for engaging said teeth with said rack and resilient means for disengaging said teeth from said rack when said nut is unscrewed.

4. A retractable strake device as claimed in claim 1, wherein each of said links comprises two tubular heads and a tubular body forming a grease container.

5. A retractable strake device for the wheels of tractors and other vehicles, comprising a first ring, brackets fastened to said first ring and adapted to be secured and laterally centered on the vehicle wheel, a second ring mounted on said first ring so as to be angularly movable with respect thereto, strakes pivotally mounted on said second ring, links connecting said strakes to fixed points of said first ring, a pin mounted on said first ring, two oppositely directed hydraulic jack cylinders pivotally mounted on said pin and a piston in each of said cylinders, each of said pistons being pivotally connected by its outer end to said second ring, so that the filling of one of said cylinders causes an angular displacement of said second ring in one direction with respect to said first ring and the emptying of the other of said cylinders, and the filling of said other cylinder causes an angular displacement of said second ring in the opposite direction with respect to said first ring and the emptying of said first mentioned cylinder.

6. A retractable strake device as claimed in claim 5, comprising a fork carrying said pin, bolts securing said fork to said first ring, a key traversed by said bolts and engaged in a slot formed in said second ring and a metal sheet extending to both sides of said fork for covering the part of said slot which is left free, laterally of said key, according to the position of said second ring with respect of said first ring.

7. A retractable strake device as claimed in claim 5, comprising two fork branches provided on one of said cylinders and pivotally mounted on said pin, a flat head provided on the other of said cylinders and pivotally mounted on said pin between said fork branches and in contact with said first mentioned cylinder between said branches, so that said cylinders prop up against each other and said pin is discharged from bending and shearing stresses.

8. A retractable strake device as claimed in claim 5, comprising for filling and emptying said cylinders a single connecting socket on each of said cylinders, each of said connecting sockets having a passage, a spring-pressed one-way valve controlling said passage, and means for opening the one-way valve pertaining to the cylinder to be emptied.

9. A retractable strake device as claimed in claim 5, comprising for filling and emptying said cylinders a single connecting socket on each of said cylinders, each of said connecting sockets having a passage, a spring-pressed one-way valve controlling said passage, a compressor for forcing a fluid into one of said cylinders, a fluid return pipe leading to said compressor, a connecting nipple at the end of said pipe for engagement with said connecting socket of the other of said cylinders, and means on said connecting nipple for opening said one-way valve in the connecting socket engaged by said connecting nipple.

10. A retractable strake device as claimed in claim 5, comprising for filling and emptying said cylinders a single connecting socket on each of said cylinders, each of said connecting sockets having a passage, a spring-pressed one-way valve controlling said passage, a stopper for closing said connecting socket and means in said stopper for opening said one-way valve in said connecting socket of the cylinder to be emptied.

LOUIS COLIN.

References Cited in the file of this patent

UNITED STATES PATENTS

| Number | Name | Date |
|---|---|---|
| 1,015,545 | Craig | Jan. 23, 1912 |
| 2,540,147 | Sutherland | Feb. 6, 1951 |
| 2,544,050 | Schnell | Mar. 6, 1951 |